United States Patent
Blackmon et al.

(10) Patent No.: US 8,082,396 B2
(45) Date of Patent: Dec. 20, 2011

(54) SELECTING A COMMAND TO SEND TO MEMORY

(75) Inventors: Herman Lee Blackmon, Moline, IL (US); Philip Rogers Hillier, III, Rochester, MN (US); Joseph Allen Kirscht, Rochester, MN (US); Brian T. Vanderpool, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 1583 days.

(21) Appl. No.: 11/116,626

(22) Filed: Apr. 28, 2005

(65) Prior Publication Data

US 2006/0248275 A1 Nov. 2, 2006

(51) Int. Cl.
*G06F 12/00* (2006.01)
(52) U.S. Cl. ............. 711/125; 711/136; 711/E12.071
(58) Field of Classification Search ........... 711/125
See application file for complete search history.

(56) References Cited

U.S. PATENT DOCUMENTS

| | | | | |
|---|---|---|---|---|
| 5,027,270 | A * | 6/1991 | Riordan et al. | 711/140 |
| 5,638,534 | A * | 6/1997 | Mote, Jr. | 711/158 |
| 5,835,945 | A * | 11/1998 | King et al. | 711/120 |
| 5,842,038 | A * | 11/1998 | Williams et al. | 710/5 |
| 5,933,860 | A * | 8/1999 | Emer et al. | 711/213 |
| 6,256,713 | B1 * | 7/2001 | Audityan et al. | 711/141 |
| 6,295,586 | B1 * | 9/2001 | Novak et al. | 711/154 |
| 6,496,906 | B1 * | 12/2002 | Novak et al. | 711/154 |
| 6,587,894 | B1 | 7/2003 | Stracovsky et al. | |
| 6,728,845 | B2 * | 4/2004 | Adiletta et al. | 711/154 |
| 6,877,077 | B2 * | 4/2005 | McGee et al. | 711/158 |
| 2004/0260891 | A1 * | 12/2004 | Jeddeloh et al. | 711/154 |
| 2005/0114556 | A1 * | 5/2005 | Solomon et al. | 710/5 |

FOREIGN PATENT DOCUMENTS

JP 05181737 A 7/1993

OTHER PUBLICATIONS

Definition of "queue" as provided by American Heritage Dictionary (cited from http://www.dictionary.com).*

* cited by examiner

*Primary Examiner* — Reginald Bragdon
*Assistant Examiner* — Eric Loonan
(74) *Attorney, Agent, or Firm* — Owen J. Gamon

(57) ABSTRACT

A method, apparatus, system, and signal-bearing medium that, in an embodiment, select a command to send to memory. In an embodiment, the oldest command in a write queue that does not collide with a conflict queue is sent to memory and added to the conflict queue if some or all of the following are true: all of the commands in the read queue collide with the conflict queue, any read command incoming from the processor does not collide with the write queue, the number of commands in the write queue is greater than a first threshold, and all commands in the conflict queue have been present for less than a second threshold. In an embodiment, a command does not collide with a queue if the command does not access the same cache line in memory as the commands in the queue. In this way, in an embodiment, write commands are sent to the memory at a time that reduces the impact on the performance of read commands.

10 Claims, 5 Drawing Sheets

SELECTING A COMMAND TO SEND TO MEMORY

FIELD

This invention generally relates to computer systems and more specifically relates generally to a memory controller that sends commands to memory.

BACKGROUND

The development of the EDVAC computer system of 1948 is often cited as the beginning of the computer era. Since that time, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

One component of a computer system that can have a dramatic impact on the performance of the computer system is the memory subsystem. Computer systems typically include one or more processors coupled to the memory subsystem via a processor bus. The memory subsystem typically includes a memory controller coupled to one or more Synchronous Dynamic Random Access Memory (SDRAM) modules via a memory data bus and associated control signals. The memory controller is responsible for accepting memory read and write (load and store) commands or requests from the processor, interfacing with the SDRAMs to perform a read or write command, and returning any data associated with the read operation from the SDRAMs back to the processor. The memory controller also has the task of managing memory bank timing, maximizing the utilization of the memory data bus, and optimizing memory accesses, such as prioritizing reads over writes when possible.

Optimizing memory accesses has been a fundamental issue with increasing computer system performance. One memory access issue that memory controllers have struggled with is the selection of read commands versus write commands. Typically, read commands are the limiting factor for system performance because either the processor must wait for the read data, in order to continue to execute instructions, or the processor prefetches read data and then attempts to hide memory latency. Write commands typically are not as serious an issue since the processor considers them to be complete as soon as the processor sends the write data to the memory controller. Memory controllers, however, have a fixed number of buffers (or queues) to hold write commands and data. Once the buffers are nearly full, the memory controller needs to signal the processor that no new commands can be taken, which stalls the bus, due to possibly overflowing the write queue in the memory controller. This stalling can cause extra delay for all processor commands; thus, write commands can become a performance issue for the read commands.

Thus, a better way is needed to choose the appropriate time to send write commands to the memory, in order to allow to increase performance.

SUMMARY

A method, apparatus, memory controller, system, and signal-bearing medium are provided that, in an embodiment, select a command to send to memory. In an embodiment, the oldest command in a write queue that does not collide with a conflict queue is sent to memory and added to the conflict queue if some or all of the following are true: all of the commands in the read queue collide with the conflict queue, any read command incoming from the processor does not collide with the write queue, the number of commands in the write queue is greater than a first threshold, and all commands in the conflict queue have been present for less than a second threshold. In an embodiment, a command does not collide with a queue if the command does not access the same cache line in memory as the commands in the queue. In this way, in an embodiment, write commands are sent to the memory at a time that reduces the impact on the performance of read commands.

BRIEF DESCRIPTION OF THE DRAWINGS

Various embodiments of the present invention are hereinafter described in conjunction with the appended drawings.

It is to be noted, however, that the appended drawings illustrate only example embodiments of the invention, and are therefore not considered limiting of its scope, for the invention may admit to other equally effective embodiments.

DETAILED DESCRIPTION

Figure 1:
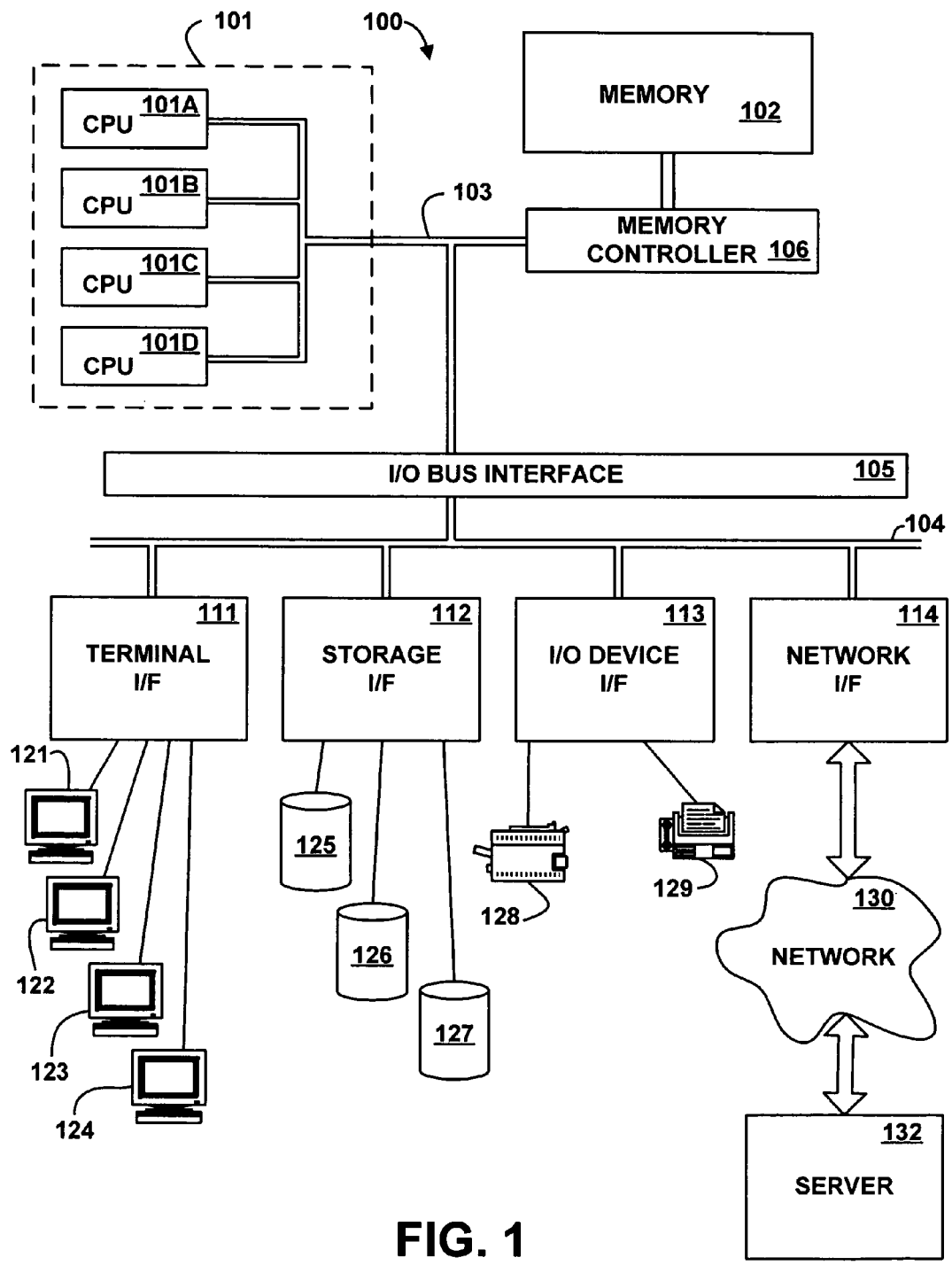
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system 100 connected via a network 130 to a server computer system 132, according to an embodiment of the present invention. The designations "computer system" and "server" are used for convenience only, and, in an embodiment, a computer that operates as a client to one computer may operate as server to another computer, and vice versa, and any appropriate electronic devices may be used. In an embodiment, the hardware components of the computer system 100 may be implemented by an IBM eServer iSeries or pSeries computer system. However, those skilled in the art will appreciate that the mechanisms and apparatus of embodiments of the present invention apply equally to any appropriate computing system.

The major components of the computer system 100 include one or more processors 101, a main memory 102, a memory controller 106, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more programmable central processing units (CPUs) 101A, 101B, 101C, and 101D, herein generically referred to as the processor 101. The processors 101 may include general purpose processors, specific purpose processors, and/or state machines and may couple with the memory controller 106 via the bus 103 to issue commands such as load and store (read and write) commands to access the memory 102. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In various embodiments, the memory 102 may be any level of cache or main memory. In an embodiment, the memory 102 is implemented as DRAM (Dynamic Random Access Memory), but in other embodiments any appropriate memory technology may be used.

The interface between the memory controller 106 and the memory 102 typically consists of command signals, such as a read address strobe (RAS) and a column address strobe (CAS) driven by the memory controller 106 to the memory via a bidirectional data bus having data lines and data strobes. Each command signal driven by the memory controller 106 typically involves a number of cycles of latency. Further, after the commands are performed on, e.g., a bank of an extent of the memory, the bank normally requires additional cycles to recover before that bank can perform another operation. For example, to implement a read or load, the memory controller 106 opens the bank, issues a read command, waits the requisite cycles for the CAS latency, and receives a burst of data from the memory. After the data is burst to the memory controller, the bank requires several cycles to pre-charge rows of an internal bus associated with the load.

In an embodiment, the memory controller 106 includes a processor (analogous to the processor 101) and instructions capable of executing on its processor or statements capable of being interpreted by instructions executing on its processor to perform the functions as further described below with reference to FIGS. 3, 4, and 5. In another embodiment, the memory controller 106 may be implemented in microcode or firmware. In another embodiment, the memory controller 106 may be implemented in hardware via logic gates and/or other appropriate hardware techniques. The memory controller 106 is further described below with reference to FIG. 2.

The memory bus 103 provides a data communication path for transferring data among the processor 101, the memory controller 106, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127.

The I/O and other device interface 113 provides an interface to any of various other input/output devices or devices of other types. Two such devices, the printer 128 and the fax machine 129, are shown in the exemplary embodiment of FIG. 1, but in other embodiments many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the memory controller 106, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100 and the server 132. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hardwired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number (including zero) of networks (of the same or different types) may be present.

FIG. 1 is intended to depict the representative major components of the computer system 100, the network 130, and the server 132 at a high level; individual components may have greater complexity than represented in FIG. 1; components other than or in addition to those shown in FIG. 1 may be present; and the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM, DVD-R, or DVD+R;

(2) alterable information stored on a rewriteable storage medium, e.g., a hard disk drive (e.g., the DASD 125, 126, or 127), CD-RW, DVD-RW, DVD+RW, DVD-RAM, or diskette; or (3) information conveyed by a communications medium, such as through a computer or a telephone network, e.g., the network 130, including wireless communications.

Such signal-bearing media, when carrying machine-readable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
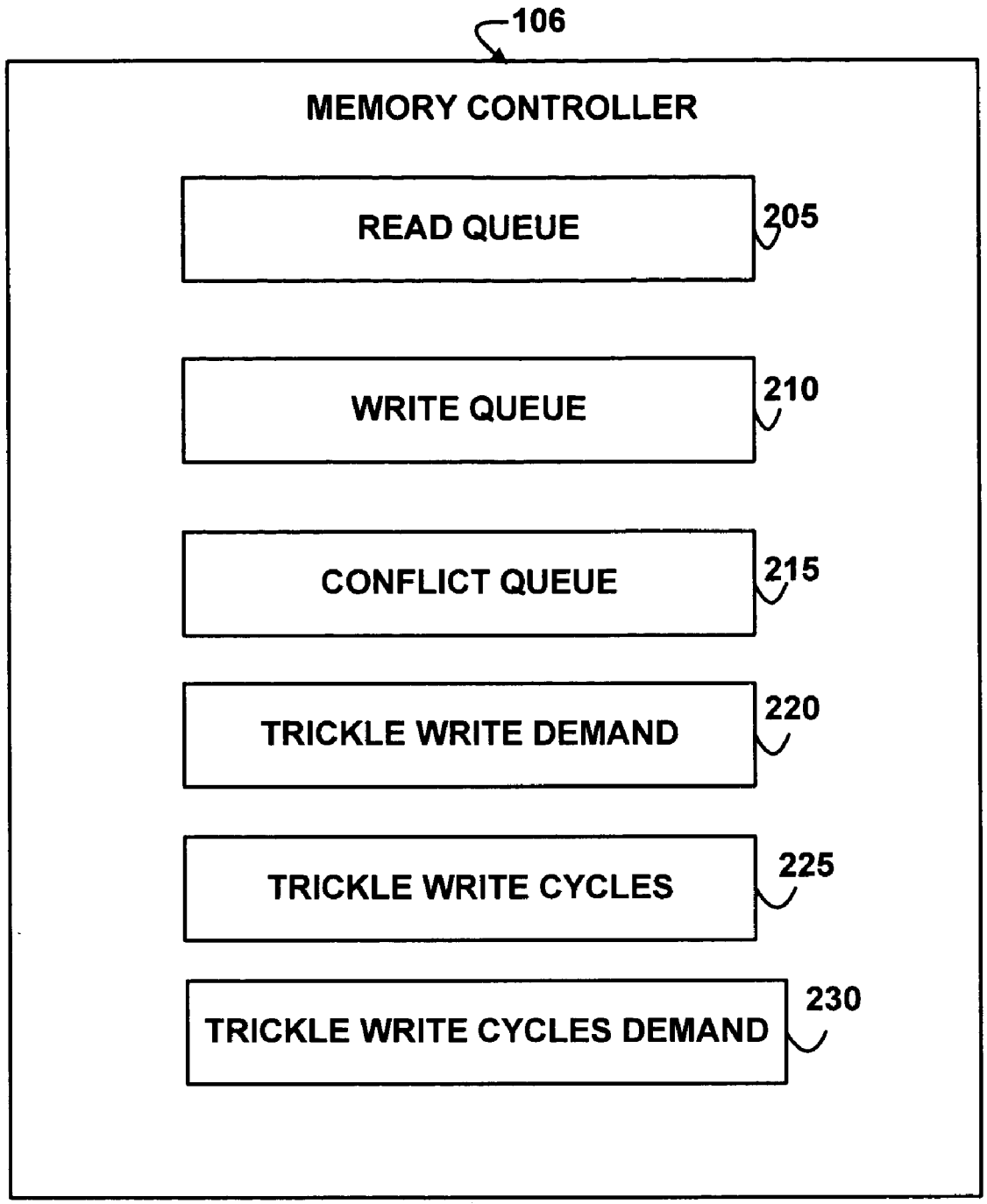
FIG. 2 depicts a block diagram of an example memory controller, according to an embodiment of the invention.

FIG. 2 depicts a block diagram of the example memory controller 106, according to an embodiment of the invention. The memory controller 106 includes a read queue 205, a write queue 210, a conflict queue 215, a trickle write demand register 220, a trickle write cycles register 225, and a trickle write cycles demand register 230. The values in the trickle write demand register 220, the trickle write cycles register 225, and/or the trickle write cycles demand register 230 may be set by the designer of the memory controller 106, or the memory controller 106 may receive them from a user or system administrator of the computer 100, from any appropriate hardware and/or software of the computer 100, or via the network 130.

The read queue 205 stores read commands received from the processor 101 that the memory controller 106 has not yet sent to the memory 102. The write queue 210 stores write commands received from the processor 101 that the memory controller 106 has not yet sent to the memory 102. The conflict queue 215 stores both read and write commands that the memory controller 106 has previously sent to the memory 102, but for which a threshold amount of time since the command was sent has not yet expired. The conflict queue 215 further includes logic or instructions capable of executing on a processor to perform the functions as further described below with reference to FIGS. 3, 4, and 5.

The trickle write demand register 220 stores a number of processor cycles, clock cycles, or an amount of time threshold, which the conflict queue 215 compares against the number of commands in the write queue 210. If the number of commands in the write queue 210 exceeds the value of the trickle write demand register 220, then the conflict queue 215 is in trickle write demand mode, as further described below with reference to FIG. 4.

The trickle write cycles register 225 stores a number of processor cycles, clock cycles, or an amount of time threshold, which the conflict queue 215 compares against the number of processor cycles, clock cycles, or amount of time that a command has been present in the conflict queue 215. If the value in the trickle write cycles register 225 exceeds the number of cycles or amount of time that the command has been present in the conflict queue 215, then the conflict queue 215 sends the oldest write command in the write queue 210 to the memory 102 that does not collide with the conflict queue 215, as further described below with reference to FIG. 4. A command collides with a queue if the command and at least one of the commands in the queue access the same cache line in the memory 102. A command does not collide with a queue if the command does not access the same cache line in the memory 102 as all of the commands in the queue.

The trickle write cycles demand register 230 stores a number of processor cycles, clock cycles, or an amount of time threshold, which the conflict queue 215 compares against the number of processor cycles, clock cycles, or amount of time that a command has been present in the conflict queue 215. If the value in the trickle write cycles demand register 230 exceeds the number of cycles or amount of time that the command has been present in the conflict queue 215, then the conflict queue 215 sends the oldest write command in the write queue 210 that does not collide with the conflict queue 215 to the memory 102, as further described below with reference to FIG. 5.

In various other embodiments, the trickle write demand register 220, the trickle write cycles register 225, and/or the trickle write cycles demand register 230 may be implemented as memory locations in the memory controller 106.

Figure 3:
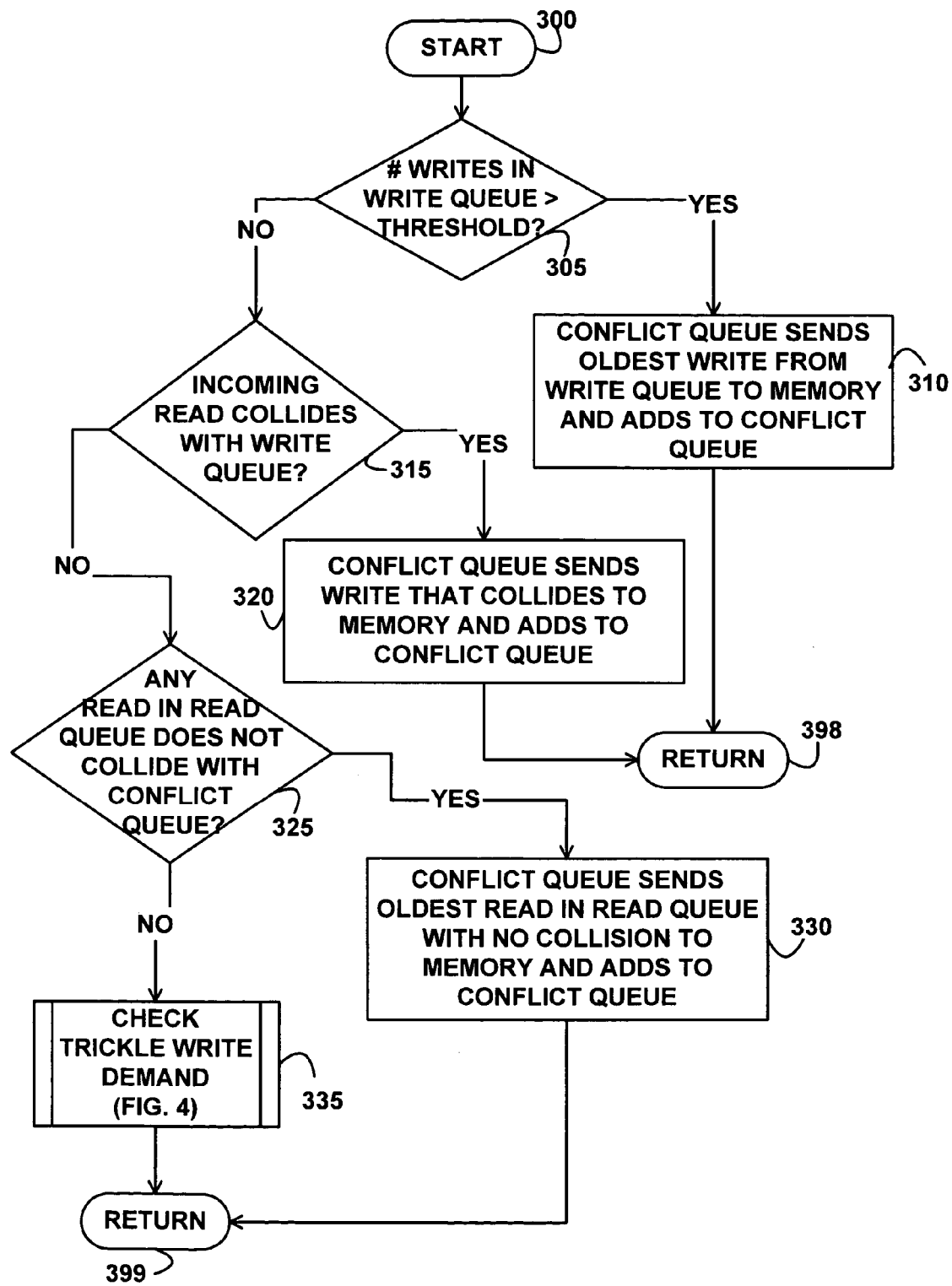
FIG. 3 depicts a flowchart of example processing for the memory controller according to an embodiment of the invention.

FIG. 3 depicts a flowchart of example processing for the memory controller 106, according to an embodiment of the invention. The example logic illustrated in FIG. 3 is performed every processor cycle or every clock cycle of the memory controller 106. Control begins at block 300. Control then continues to block 305 where the conflict queue 215 determines whether the number of writes in the write queue 210 exceeds a write queue threshold. If the determination at block 305 is true, then the number of writes in the write queue 210 exceeds the write queue threshold, so control continues to block 310 where the conflict queue 215 sends the oldest write command from the write queue 210 to the memory 102 and adds that write command to the conflict queue 215. Control then continues to block 398, where the logic of FIG. 3 returns.

If the determination at block 305 is false, then the number of writes in the write queue 210 does not exceed the write queue threshold, so control continues from block 305 to block 315 where the conflict queue 215 determines whether an incoming read command from the processor 101 collides with any of the commands in the write queue 210. An incoming read command collides with a command in the write queue 210 if both commands intend to access the same cache line in the memory 102.

If the determination at block 315 is true, an incoming read command collides with the write queue 210, so control continues to block 320 where the conflict queue 215 sends the write command that collides with the incoming read command from the write queue 210 to the memory 102 and adds that write command to the conflict queue 215. Control then continues to block 398, where the logic of FIG. 3 returns.

If the determination at block 315 is false, then the incoming read command does not collide with a write command in the write queue 210, so control continues from block 315 to block 325 where the conflict queue 215 determines whether any read command in the read queue 205 exists that does not collide with a command in the conflict queue 215.

If the determination at block 325 is true, then a read command exists in the read queue 205 that does not collide with the conflict queue 215, so control continues to block 330 where the conflict queue 215 sends the oldest read command in the read queue 205 that does not collide with all write commands in the write queue 210 to the memory 102 and adds this read command to the conflict queue 215. Control then continues to block 399, where the logic of FIG. 3 returns.

Figure 4:
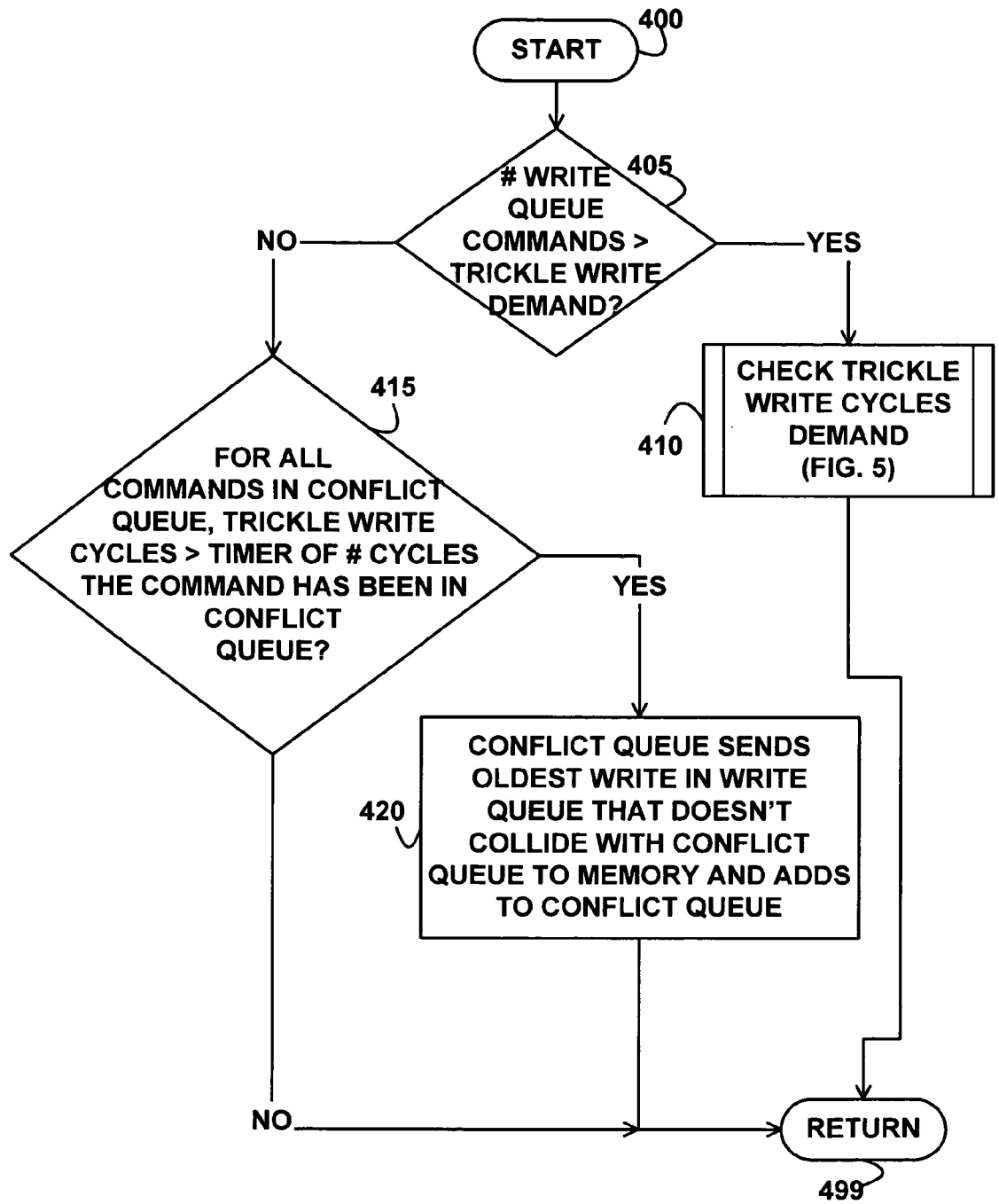
FIG. 4 depicts a flowchart of a further example processing for the memory controller, according to an embodiment of the invention.

If the determination at block 325 is false, then all read commands in the read queue 205 collide with at least one command in the conflict queue 215, so control continues to block 335 where the logic of FIG. 4 is executed, as further described below. Control then continues to block 399 where the logic of FIG. 3 returns.

FIG. 4 depicts a flowchart of a further example processing for the memory controller 106, according to an embodiment of the invention. Control begins at block 400. Control then continues to block 405 where the conflict queue 215 determines whether the number of commands in the write queue 210 is greater than the value in the trickle write demand register 220. If the determination at block 405 is true, then the number of commands in the write queue 210 is greater than the value in the trickle write demand register 220, so control continues to block 410 where the logic of FIG. 5 is executed, as further described below. Control then continues to block 499 where the logic of FIG. 4 returns.

If the determination at block 405 is false, then the number of commands in the write queue 210 is not greater than the value in the trickle write demand register 220, so control continues from block 405 to block 415 where the conflict queue 215 determines, for all commands in the conflict queue 215, whether the value in the trickle write cycles register 225 is greater then a timer value of the number of processor cycles, clock cycles, or amount of time that all of the commands have been present in the conflict queue 215. In an embodiment, all commands stored in the conflict queue 215 have a separate associated timer that keeps track of the amount of time or number of cycles that the command has been present in the conflict queue 215.

If the determination at block 415 is true, then the value in the trickle write cycles register 225 is greater than the number of cycles or amount of time that all commands have been present in the conflict queue 215, so control continues to block 420 where the conflict queue 215 sends the oldest write command (the write command that has been present the longest) in the write queue 210 that does not collide with the conflict queue 215 to the memory 102 and adds that write command to the conflict queue 215. Control then continues to block 499 where the logic of FIG. 4 returns.

If the determination at block 415 is false, then the value in the trickle write cycles register 225 is not greater than the number of cycles or amount of time that all of the commands have been present in the conflict queue 215, so control continues from block 415 to block 499 where the logic of FIG. 4 returns.

Figure 5:
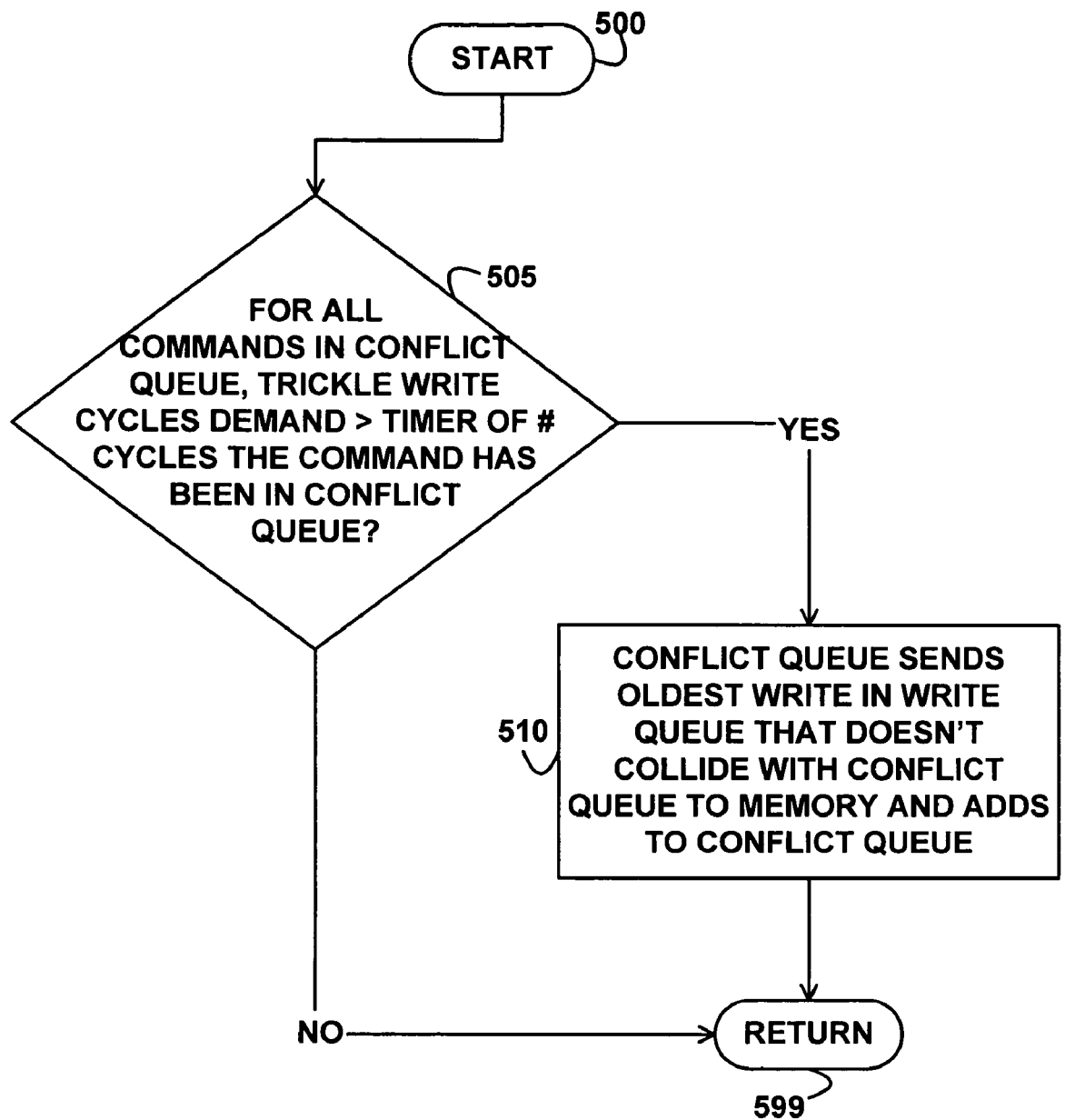
FIG. 5 depicts a flowchart of a further example processing for the memory controller, according to an embodiment of the invention.

FIG. 5 depicts a flowchart of a further example processing for the memory controller 106, according to an embodiment of the invention. Control begins at block 500. Control then continues to block 505 where the conflict queue 215 determines, for all commands in the conflict queue 215, whether the value in the trickle write cycles demand register 230 exceeds a timer value of the number of processor cycles, clock cycles, or amount of time that the command has been present in the conflict queue 215.

If the determination at block 505 is true, then the value in the trickle write cycles demand register 230 exceeds the number of cycles that all commands have been present in the conflict queue 215, so control continues to block 510 where the conflict queue 215 sends the oldest write command in the write queue 210 that does not collide with the conflict queue 215 to the memory 102 and adds that write command to the conflict queue 215. Control then continues to block 599 where the logic of FIG. 5 returns.

If the determination at block 505 is false, then the value in the trickle write cycles demand register 230 does not exceed the number of cycles that all commands has been present in the conflict queue 215, so control continues to block 599 where the logic of FIG. 5 returns.

In this way, the impact of write commands on the performance of read commands is reduced because, in an embodiment, write commands are only sent from the write queue 210 to the memory 102 if the write queue 210 is nearly full and, if action is not taken, stalling of the bus 103 could occur.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

What is claimed is:

1. A method comprising:
    determining whether a number of commands in a write queue is greater than a first threshold;
    if the determining is true, deciding whether all commands in a conflict queue have been present in the conflict queue for less than a second threshold number of cycles;
    if the deciding is true, selecting an oldest command in the write queue that does not collide with any of the commands in the conflict queue, wherein the selecting further comprises determining that the oldest command in the write queue that does not collide with any of the commands in the conflict queue does not access a same cache line in memory as any of the commands in the conflict queue, wherein the conflict queue comprises the commands that were previously sent to the memory; and
    sending the oldest command that does not collide with any of the commands in the conflict queue from the write queue to the memory.

2. The method of claim 1, further comprising:
    adding the oldest command that does not collide with any of the commands in the conflict queue to the conflict queue.

3. The method of claim 1, wherein the selecting further comprises:
    determining whether the oldest command in the write queue is to access a same cache line in the memory as any of the commands in the conflict queue.

4. The method of claim 1, wherein the determining further comprises:
    determining whether all commands in a read queue collide with the conflict queue.

5. The method of claim 1, wherein the determining further comprises:
    determining whether any read command incoming from a processor does not collide with the write queue.

6. A computer system comprising:
    a processor;
    memory; and
    a memory controller that receives commands from the processor, wherein the memory controller comprises:
        a write queue, and
        a conflict queue that comprises the commands that the memory controller previously sent to the memory, wherein the conflict queue sends an oldest command in the write queue to the memory that does not collide with any of the commands in the conflict queue if a number of commands in the write queue is greater than a first threshold and all of the commands in the conflict queue have been present in the conflict queue for less than a second threshold number of cycles, wherein the conflict queue further determines that the oldest command in the write queue that does not collide with any of the commands in the conflict queue does not access a same cache line in the memory as any of the commands in the conflict queue.

7. The computer system of claim 6, wherein the conflict queue further adds the oldest command to the conflict queue if the conflict queue sends the oldest command to the memory.

8. The computer system of claim 6, wherein the conflict queue further sends the oldest command in the write queue to the memory that does not collide with any of the commands the conflict queue based on if all commands in a read queue collide with the conflict queue.

9. The computer system of claim 6, wherein the conflict queue sends the oldest command in the write queue to the memory that does not collide with any of the commands the conflict queue based on if any read command incoming from a processor does not collide with the write queue.

10. The computer system of claim 6, wherein the memory controller further comprises a first register and a second register, and where the memory controller further stores the first threshold in the first register and stores the second threshold in the second register.

* * * * *